United States Patent
Davis

(10) Patent No.: US 7,190,834 B2
(45) Date of Patent: Mar. 13, 2007

(54) METHODS FOR FINDING AND CHARACTERIZING A DEFORMED PATTERN IN AN IMAGE

(75) Inventor: Jason Davis, Bellingham, MA (US)

(73) Assignee: Cognex Technology and Investment Corporation, Mountain View, CA (US)

( * ) Notice: Subject to any disclaimer, the term of this patent is extended or adjusted under 35 U.S.C. 154(b) by 733 days.

(21) Appl. No.: 10/625,205

(22) Filed: Jul. 22, 2003

(65) Prior Publication Data

US 2005/0018904 A1    Jan. 27, 2005

(51) Int. Cl.
G06K 9/00    (2006.01)
G06K 9/46    (2006.01)

(52) U.S. Cl. ...................... 382/181; 382/191
(58) Field of Classification Search ................ 382/151, 382/173, 177, 181, 190, 195, 197, 199, 217, 382/291, 294–296, 321; 345/467; 381/408; 235/494
See application file for complete search history.

(56) References Cited

U.S. PATENT DOCUMENTS

| | | |
|---|---|---|
| 3,936,800 A | 2/1976 | Ejiri et al. |
| 4,115,702 A | 9/1978 | Nopper |
| 4,115,762 A | 9/1978 | Akiyama et al. |
| 4,183,013 A | 1/1980 | Agrawala et al. |
| 4,200,861 A | 4/1980 | Hubach et al. |
| 4,441,248 A | 4/1984 | Sherman et al. |
| 4,570,180 A | 2/1986 | Baier et al. |
| 4,685,143 A | 8/1987 | Choate |
| 4,688,088 A | 8/1987 | Hamazaki et al. |
| 4,736,437 A | 4/1988 | Sacks et al. |
| 4,763,280 A | 8/1988 | Robinson et al. |
| 4,783,826 A | 11/1988 | Koso |
| 4,860,374 A | 8/1989 | Murakami et al. |

(Continued)

FOREIGN PATENT DOCUMENTS

DE    44 06 020 C 1    6/1995

OTHER PUBLICATIONS

Gdalyahu Y et al.: Self-Organization in Vision: Stochastic Clustering for Image Segmentation Perceptual Grouping, and Image Database Organization: IEEE Transactions on Pattern Analysis and Machine Intelligence, IEEE Inc. New York, vol. 23, No. 10, Oct. 2001, pp. 1053-1074.

(Continued)

*Primary Examiner*—Kanjibhai Patel
(74) *Attorney, Agent, or Firm*—Russ Weinzimmer

(57) ABSTRACT

A method is disclosed for finding a deformed pattern in an image using a plurality of sub-patterns. By advantageously restricting sub-pattern search ranges, search speed is improved, and the incidence of spurious matches is reduced. The method also quickly decides which sub-pattern result, of several potential candidates, is most likely to be the correct match for a deformed sub-pattern. Also, a method is provided for characterizing a deformed pattern in an image by using results from feature-based search tools to create a mapping that models the deformation of the pattern. A transform, selectable by a user, is fit to the results from the search tools to create a global deformation mapping. This transformation is fit only to feature points derived from matches resulting from successful sub-pattern search, without including data from areas of the pattern that were blank, not matched, or otherwise didn't contain information about the pattern's distorted location.

22 Claims, 10 Drawing Sheets

U.S. PATENT DOCUMENTS

| | | | |
|---|---|---|---|
| 4,876,457 A | 10/1989 | Bose | |
| 4,876,728 A | 10/1989 | Roth | |
| 4,922,543 A | 5/1990 | Ahlborm et al. | |
| 4,955,062 A | 9/1990 | Terui | |
| 4,959,898 A | 10/1990 | Landman et al. | |
| 4,980,971 A | 1/1991 | Bartschat et al. | |
| 5,060,276 A | 10/1991 | Morris et al. | |
| 5,086,478 A | 2/1992 | Kelly-Mahaffey et al. | |
| 5,113,565 A | 5/1992 | Cipolla et al. | |
| 5,161,201 A * | 11/1992 | Kaga et al. | 382/145 |
| 5,206,917 A * | 4/1993 | Ueno et al. | 382/288 |
| 5,226,095 A | 7/1993 | Okumura et al. | |
| 5,268,999 A | 12/1993 | Yokoyama | |
| 5,343,028 A | 8/1994 | Figarella et al. | |
| 5,371,690 A | 12/1994 | Engel et al. | |
| 5,471,541 A | 11/1995 | Burtnyk et al. | |
| 5,495,537 A | 2/1996 | Bedrosian et al. | |
| 5,497,451 A | 3/1996 | Holmes | |
| 5,500,906 A | 3/1996 | Picard et al. | |
| 5,545,887 A | 8/1996 | Smith et al. | |
| 5,602,937 A | 2/1997 | Bedrosian et al. | |
| 5,621,807 A | 4/1997 | Eibert et al. | |
| 5,625,715 A | 4/1997 | Trew et al. | |
| 5,627,912 A | 5/1997 | Matsumoto | |
| 5,627,915 A | 5/1997 | Rosser et al. | |
| 5,663,809 A | 9/1997 | Miyaza et al. | |
| 5,828,769 A | 10/1998 | Burns | |
| 5,845,288 A | 12/1998 | Syeda-Mahmood | |
| 5,933,516 A | 8/1999 | Tu et al. | |
| 6,636,634 B2 * | 10/2003 | Melikian et al. | 382/217 |
| 6,691,145 B1 * | 2/2004 | Shibata et al. | 708/801 |
| 6,785,419 B1 * | 8/2004 | Jojic et al. | 382/197 |
| 6,909,798 B1 * | 6/2005 | Yukawa et al. | 382/141 |
| 2002/0054699 A1 | 5/2002 | Roesch et al. | |

OTHER PUBLICATIONS

Pauwels E J et al: Finding Salient Regions in Images—Nonparametric Clustering for Image Segmentation and Grouping Computer Vision and Image Understanding, Academic Press, San Diego, CA, vol. 75, No. 1-2, Jul. 1999, pp. 73-85.

Scanlon J. et al.: Graph-theoretic Algorithms for Image Segmentation, Circuits and Systems, 1999, ISCAS '99. Proceedings of the 1999 IEEE International Symposium, Orlando, FL, May 30, 1999, pp. 141-144.

Jianbo Shi et al: Normalized Cuts and Image Segmentation, Computer Vision and Pattern Recognition, 1997. Proceedings, 1997 IEEE Computer Society Conference, San Juan, Puerto Rico Jun. 17-19, 1997, pp. 731-737.

Xie X L et al. A new fuzzy clustering criterion and its application to color image segmentation, Proceedings of the International Symposium on Intelligent Control, Arlington, Aug. 13-15, 1991, pp. 463-468.

Mehrotra R et al: Feature-based retrieval of similar shapes, Proceeding of the International Conference on Data Engineering. Vienna, Apr. 19-23, 1993, pp. 108-115.

Cognex Corporation, Cognex MVS-8000 Series, CVL Vision Tools Guide, pp. 25-136, Release 5.4 590-6271, Natick, MA USA 2000.

Hoogs et al., "Model-Based Learning of Segmentations", IEEE, pp. 494-499, 1996.

Medina-Mora, R., "An Incremental Programming Environment," IEEE *Transactions on Software Engineering*, Sep. 1981, pp. 472-482, vol. SE-7, No. 5, 1992.

Newman et al., "3D CAD-Based Inspection I: Coarse Verification", IEEE, pp. 49-52, 1992.

Ullman, S., "Aligning pictorial descriptions: An approach to object recognition, I: Approaches to Object Recognition," reprinted from *Cognition*, pp. 201-214, vol. 32, No. 3, Cambridge, MA USA, Aug. 1989.

deFigueiredo et al. Model Based Orientation Independent 3-D Machine Vision Techniques, IEEE Transactions on Aerospace and Electronic Systems, vol. 24, No. 5 Sep. 1988, pp. 597-607.

Bookstein, F L., "Principal Warps: Thin-Plate Splines and the Decomposition of Deformations", *IEEE Transactions on pattern Analysis and Machine Intelligence, IEEE Inc., New York*, vol. 11, No. 6, (Jun. 1, 1989).

J, Michael F., et al., "Handbook of Medical Imaging", *vol. 2: Medical image Processing and Analysis*, SPIE Press, Bellingham, WA,(2000),Chapter 8.

Stockman, G , et al., "Matching images to models for registration and object detection via clustering", *IEEE Transaction of Pattern Analysis and Machine Intelligence, IEEE Inc.*, New York, vol. PAMI-4, No. 3,,(1982).

Zhang, Zhengyou , "Parameter estimation techniques: A tutorial with application to conic fitting", *Imag and Vision Comput; Image and Vision computing: Elsevier Science Ltd.* Oxford England, vol. 15, No. 1,(Jan. 1, 1997).

Belongie, S. , et al., "Shape Matching and Object Recognition Using Shape Contexts", *IEEE Transactions on Pattern Analysis and Machine Intelligence, IEEE Inc. New York*, vol. 24, No. 4, (Apr. 2003),509-522.

Bileschi, S. , et al., "Advances in Component-based Face Detection", *Lecture notes in Computer Science, Springer Verlag*, New York, NY, vol. 2388, (2002),135-143.

Ohm, Jens-Rainer , "Digitale Bildcodierung", *Springer Verlag*, Berlin 217580, XP0002303066, Section 6.2 Bewegungschatzung,(1995).

Wei, Wen , et al., "Recognition and Inspection of Two-Dimensional Industrial Parts Using Subpolygons", *Pattern Recognition, Elsevier*, Kidlington, GB, vol. 25, No. 12, (Dec. 1, 1992),1427-1434.

* cited by examiner

Source Points

Destination Points

Source Regions

Destination Regions

Source Points

Destination Points

Deformation Map

METHODS FOR FINDING AND CHARACTERIZING A DEFORMED PATTERN IN AN IMAGE

FIELD OF THE INVENTION

This invention relates to machine vision systems, and particularly to methods for searching for a pattern in an image.

BACKGROUND OF THE INVENTION

The problem of how to find a particular pattern in an image is a well-known problem with many known solutions, such as feature-based search methods. Typically, the pattern is assumed to have undergone one or more of a few basic transformations, such as being scaled, or being rotated. However, these known solutions often fail if the pattern has been deformed by being warped, pulled, bent, wrinkled, damaged, or otherwise fundamentally changed from the original un-deformed shape that the search process is adapted to find.

Nevertheless, even after transformation of the whole pattern, if the deformed pattern is divided into smaller sub-patterns, those sub-patterns are themselves fairly close in form to the corresponding parts of the original undeformed pattern. For example, if the pattern is bent into a "V" or boomerang shape, then the two legs of the boomerang both represent good, easily-findable portions of the pattern. It's only the deformed pattern that is hard to find as an entirety. Therefore, searching for a deformed pattern in an image may be facilitated by dividing the deformed pattern into smaller sub-patterns. For many typical types of deformation encountered, most of those sub-patterns are probably findable by known feature-based search methods (because the sub-patterns are not themselves substantially distorted).

However, it is then necessary for a subsequent algorithm to combine the sub-pattern search results into a full match of the distorted whole pattern. Unfortunately, searching for a large number of sub-patterns in an image takes much longer than searching for a single whole pattern. Furthermore, sub-patterns are inherently simpler than the whole pattern, so they're more likely to be confused when they are used in searching the target image, potentially yielding many spurious matches in various locations of the target image.

It is sometimes useful to characterize the deformation of the deformed whole pattern after it has been found. However, even though a deformed whole pattern has been found, a characterization of the deformation may still not be known. The deformation of the whole pattern can be characterized after each of the sub-patterns have been located. In some cases, the deformation may be easily characterized, such as the deformation due to 3D perspective, or the deformation due to the whole pattern being wrapped around a cylinder, such as when a label is wrapped around a can. In other cases, the deformation may be more atypical, representing random wrinkles, folds, bends, dents, and so forth, and is consequently not characterized by a known or standard transformation. In either case, an automated method of characterizing deformation after finding a deformed pattern would be useful in some applications, e.g., inspecting printing on soda cans, inspecting labels on oddly shaped containers such as bags of sugar, or inspecting lot and date codes on medicine bottles. With a deformation transform that maps between the deformed pattern (e.g. the logo on a full bag of sugar or the date code on a curved bottle) and the original undeformed pattern (e.g., the logo as it would appear on a flat piece of paper), tasks using inspection tools suitable for undeformed patterns can be performed, such as inspection of logo print quality. This would be impossible without a characterization, and un-doing based on the characterization, of the deformation of the bag or bottle, because wrinkles or curvature would easily be misclassified as a print defects using inspection tools suitable for undeformed patterns, even though the print quality might otherwise be acceptable.

SUMMARY OF THE INVENTION

One general aspect of the invention is a method for finding a deformed pattern in an image. The method includes providing a plurality of features that represent the deformed pattern in the image, and then dividing the plurality of features into a plurality of sub-pluralities, each sub-plurality representing a sub-pattern in the image, a plurality of the sub-patterns representing the deformed pattern. Next a distance is determined between each pair of sub-patterns of the plurality of sub-pluralities. Then, a first sub-pattern is selected to locate in the image, locating the first sub-pattern in the image so as to provide a first sub-pattern location. Next, the first sub-pattern location is used to select a second sub-pattern to locate in the image, which is then located in the image so as to provide a second sub-pattern location. The first sub-pattern location and the second sub-pattern location are then used to determine a location of the deformed patter.

In a preferred embodiment, providing a plurality of features that represent the deformed pattern in the image includes detecting features in the image. In a further preferred embodiment, detecting features in the image includes detecting features in the image using a Sobel edge detector.

In another preferred embodiment, determining a distance between each pair of sub-patterns of the plurality of sub-patterns includes storing each distance for later use. In another embodiment, determining a distance between each pair of sub-patterns of the plurality of sub-patterns includes determining the minimum distance between the pair of sub-patterns. In yet another embodiment, determining a distance between each pair of sub-patterns of the plurality of sub-patterns includes determining the distance between a first feature of a first sub-pattern and a second feature of a second sub-pattern. In still another embodiment, determining a distance between each pair of sub-patterns of the plurality of sub-patterns includes determining the distance between a first center of a first sub-pattern and a second center of a second sub-pattern.

In a preferred embodiment, locating the first sub-pattern in the image so as to provide a first sub-pattern location includes using a feature-based search method for locating the first sub-pattern in the image. In another embodiment, locating the second sub-pattern in the image so as to provide a second sub-pattern location includes computing a search area using the location of the first sub-pattern. In an alternate embodiment, locating, the second sub-pattern in the image so as to provide a second sub-pattern location includes computing an expected angle and an expected scale of the second sub-pattern.

In a preferred embodiment, the expected scale is the expected X-dimension scale and the expected Y-dimension scale. In a further preferred embodiment, an expected aspect ratio of the second sub-pattern is also computed. In another embodiment, the expected angle and the expected scale of the second sub-pattern is used so as to provide an angular search range and a scale search range. In a further preferred embodiment, the scale search range is an X-dimension scale search range, and a Y-dimension scale search range. In another further embodiment, a distance between the first sub-pattern and the second sub-pattern, and a deformation rate, is used.

In a preferred embodiment of the method of the invention, locating the second sub-pattern in the image so as to provide a second sub-pattern location includes computing a search area using the location of the first sub-pattern, and then computing an expected angle of the second sub-pattern and an expected scale of the second sub-pattern using the angle and scale of the first sub-pattern. Next, the expected angle of the second sub-pattern, the expected scale of the second sub-pattern, a distance between the first sub-pattern and the second sub-pattern, and a deformation rate are all used so as to provide an expanded search area, an angular search range, and a scale search range. Then, the second sub-pattern is located within the expanded search area, the angular search range, and the scale search range so as to provide a second sub-pattern location.

In a further preferred embodiment, using the expected angle of the second sub-pattern, the expected scale of the second sub-pattern, a distance between the first sub-pattern and the second sub-pattern, and a deformation rate so as to provide an expanded search area, an angular search range, and a scale search range includes increasing the size of the expanded search area, the angular search range, and the scale search range upon an increase in the distance between the first sub-pattern and the second sub-pattern.

In an alternate further preferred embodiment, using the expected angle of the second sub-pattern, the expected scale of the second sub-pattern, a distance between the first sub-pattern and the second sub-pattern, and a deformation rate so as to provide an expanded search area, an angular search range, and a scale search range includes increasing, in proportion to the deformation rate, the size of the expanded search area, the angular search range, and the scale search range. In yet another embodiment, using the expected angle of the second sub-pattern, the expected scale of the second sub-pattern, a distance between the first sub-pattern and the second sub-pattern, and a deformation rate so as to provide an expanded search area, an angular search range, and a scale search range includes increasing, in proportion to the deformation rate, the size of the expanded search area, the angular search range, and the scale search range upon an increase in the distance between the first sub-pattern and the second sub-pattern.

In further embodiments, computing an expected angle of the second sub-pattern and an expected scale of the second sub-pattern using the angle and scale of the first sub-pattern includes computing an expected X-dimension scale and an expected Y-dimension scale using the X-dimension scale of the first sub-pattern and the Y-dimension scale of the first sub-pattern, respectively. In another embodiment, computing an expected angle of the second sub-pattern and an expected scale of the second sub-pattern using the angle and scale of the first sub-pattern includes computing an angular uncertainty and a scale uncertainty of the second sub-pattern using an angular uncertainty and a scale uncertainty of the first sub-pattern, respectively. In a further embodiment, computing an angular uncertainty and a scale uncertainty of the second sub-pattern using an angular uncertainty and a scale uncertainty of the first sub-pattern, respectively includes computing an X-dimension scale uncertainty and a Y-dimension scale uncertainty of the second sub-pattern using an X-dimension scale uncertainty of the first sub-pattern, and a Y-dimension scale uncertainty of the first sub-pattern, respectively.

Another general aspect of the invention is a method for characterizing a deformed pattern in an image. The method includes providing a plurality of features that represent the deformed pattern in the image; dividing the plurality of features into a plurality of sub-pluralities, each sub-plurality representing a sub-pattern in the image, a plurality of the sub-patterns representing the deformed pattern; determining a distance between each pair of sub-patterns of the plurality of sub-pluralities; locating a first sub-pattern in the image so as to provide a first sub-pattern location; locating a second sub-pattern in the image so as to provide a second sub-pattern location; and then using the first sub-pattern location and the second sub-pattern location for determining a deformation mapping that characterizes the deformed pattern in the image.

Another general aspect of the invention is another method for characterizing a deformed pattern in an image, wherein the method includes dividing the deformed pattern into at least a first sub-pattern and a second sub-pattern; locating the first sub-pattern in the image so as to provide a first sub-pattern pose; locating the second sub-pattern in the image so as to provide a second sub-pattern pose; and then using the first sub-pattern pose and the second sub-pattern pose for determining a deformation mapping that characterizes the deformed pattern in the image.

In a preferred embodiment, using the first sub-pattern pose and the second sub-pattern pose for determining a deformation mapping that characterizes the deformed pattern in the image includes deriving a plurality of source points from the first sub-pattern and a plurality of source points from the second sub-pattern; generating a plurality of destination points from the source points and the sub-pattern poses; and then using a transform to fit the plurality of source points and plurality of destination points so as to create the global deformation map. In preferred embodiments, the transform is a perspective transform, or is an affine transform, or is a spline transform, or is a thin-plate spline transform, or is a cylinder transform.

In further embodiments, the transform is fit using a least-squares-fit method, or a Total Variation method, or a Robust M-estimators method, or a Minimum $L_p$-Norm Estimation, or a Least Median of Squares method. In other embodiments, the first sub-pattern and the second sub-pattern each include a plurality of feature points. In yet other embodiments, the first sub-pattern and the second sub-pattern each include a region. In a preferred embodiment, each region is converted into feature points. In further preferred embodiments, each region is converted into feature points by representing each sub-pattern as a region having a boundary and interior area, and then selecting a plurality of boundary points along the boundary. In a yet further preferred embodiment, the boundary points include corners. In an alternate embodiment, the boundary points include a point midway between two vertices of the boundary.

In another preferred embodiment, deriving a plurality of source points from the first sub-pattern and a plurality of source points from the second sub-pattern includes representing each sub-pattern as a region having a boundary and an interior area, and then selecting at least one interior point. In another preferred embodiment, deriving a plurality of source points from the first sub-pattern and a plurality of source points from the second sub-pattern includes representing each sub-pattern as a region having a boundary and an interior area, and then selecting a plurality of boundary points along the boundary. In a further embodiment, the boundary points include corners. In another embodiment, the boundary points include a point midway between two vertices of the boundary.

In another preferred embodiment, dividing the deformed pattern into at least a first sub-pattern and a second sub-pattern includes dividing the deformed pattern in the image into a plurality of contiguous rectilinear regions so as to form a grid that extends over at least most of the deformed pattern, thereby providing at least a first sub-pattern and a second sub-pattern; and then deriving a plurality of source points from at least the first sub-pattern and the second sub-pattern.

In yet another preferred embodiment, deriving a plurality of source points from the first sub-pattern and a plurality of source points from the second sub-pattern includes representing each sub-pattern as a plurality of feature points, and then sub-sampling the plurality of feature points so as to reduce the number of feature points in each sub-pattern.

The method of the invention effectively restricts sub-pattern search ranges, which both improves search speed and reduces the number of spurious matches. The method of the invention also quickly decides which sub-patterns, out of several potential candidates, is most likely to correctly match a deformed sub-pattern.

The deformation characterization method of the invention uses results from feature-based search tools (typically the "pose" of each sub-pattern of a deformed whole pattern, the pose including position, angle, x-dimension scale, and y-dimension scale information, for example) to create a mapping that models the deformation of the pattern in the image. A transform, selectable by a user, is fit to the results from the feature-based search tools to create a global deformation mapping. This transformation is fit only to feature points derived from matches resulting from successful sub-pattern search, without including data from areas of the pattern that were blank, not matched, or otherwise didn't contain information about the pattern's distorted location.

BRIEF DESCRIPTION OF THE DRAWING

The invention will be more fully understood by reference to the detailed description, in conjunction with the following figures, wherein.

DETAILED DESCRIPTION

Figure 1:
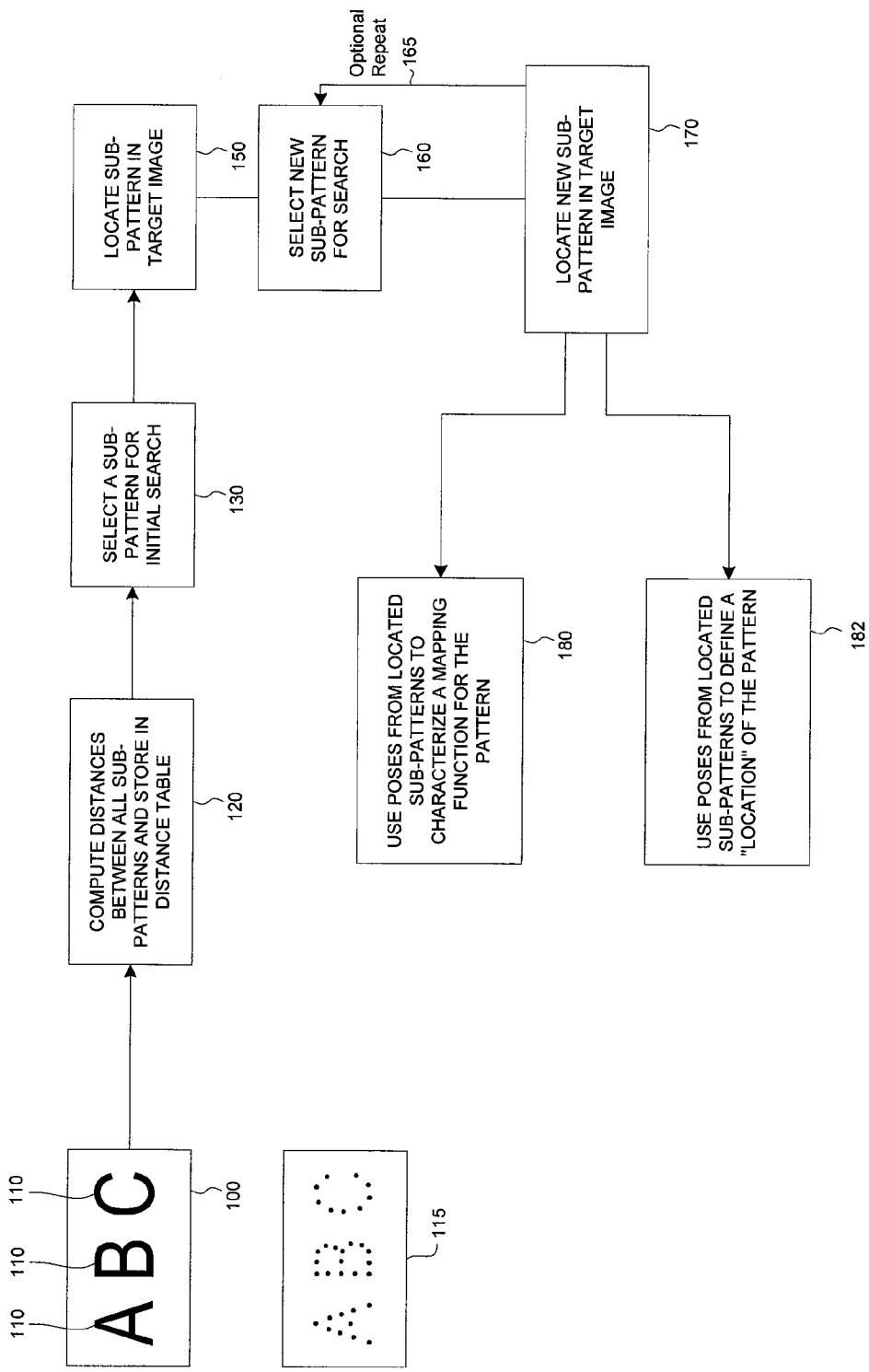
FIG. 1 is a flow chart of an embodiment of the method of the invention.
Figure 2A:
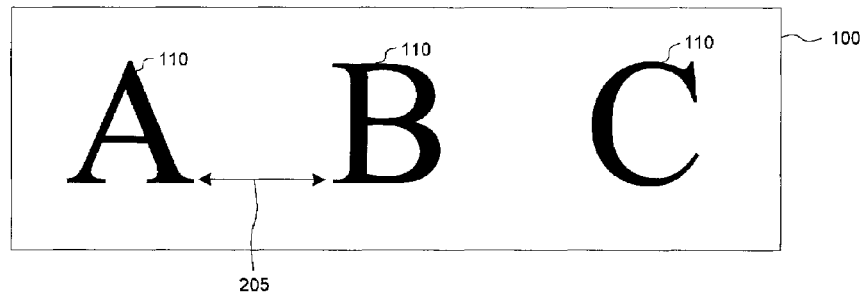
FIG. 2A is an example of a target image having a pattern to be analyzed by the method of the invention, the pattern having three sub-patterns.
Figure 2B:
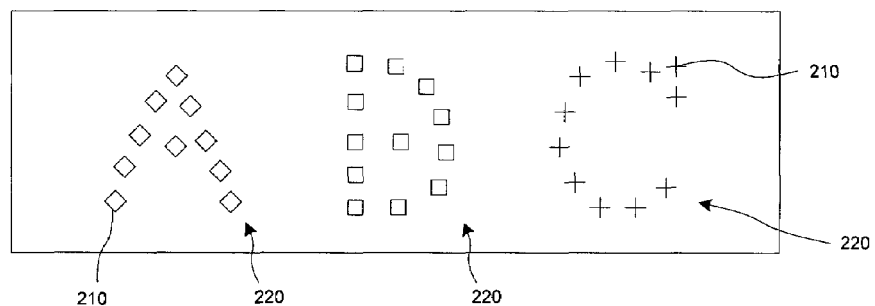
FIG. 2B is a collection of feature points derived from the pattern of FIG. 2A.

Referring to FIGS. 1 and 2, this method takes as input a target image having a pattern to be analyzed 100 (the letters A, B, and C, taken together), which is partitioned into a set of two or more sub-patterns 110 (the letters A, B, C; individually). These sub-patterns 110 are selected to be "spatially coherent" (a coherent sub-pattern tends to contain areas of the image that are connected to each other, and tends not to contain areas that aren't connected. For example, the region of the image where the "A", lies in FIG. 2A is connected by virtue of being part of the "A", so that would tend to be one coherent sub-pattern, but elements of the "B" would not be included because there is a gap such as in 205 between those elements), such that each sub-pattern 110 represents a particular region of the main pattern, and together the sub-pattern regions cover the majority of the area of the larger pattern 100 where pattern information, such as boundaries between light and dark regions, is found. In one embodiment, to obtain a plurality of spatially coherent sub-patterns, the main pattern is divided into rectangles by a grid, where each sub-pattern covers the area spanned by a rectangle.

In a preferred embodiment, to obtain more spatially coherent sub-patterns, the main pattern is converted into feature points 210 by any method known in the art, such as by using a Sobel edge detector, where each feature point represents a point of pattern information, such as a point along a brightness boundary (i.e., an edge) within the image. These feature points are then clustered into sub-groups 220 using any known partitioning algorithm, such as simply dividing the points into groups by applying a regular grid to partition the area, or other clustering algorithm, such as the well-known "nearest-neighbor" or "k-means" clustering methods. Each clustered group then represents a sub-pattern. In another preferred embodiment, the feature points are clustered into sub-groups using the methods taught in co-pending U.S. patent application entitled "METHOD FOR PARTITIONING A PATTERN INTO OPTIMIZED SUB-PATTERNS", filed Jul. 22, 2003. In another preferred embodiment, these feature points 115 are provided directly as inputs, in lieu of the image 100.

These feature points 115 need not be restricted to two-dimensional (2D) points. One skilled in the art can readily see that a pattern can be represented in any number of dimensions, for example 3D, with no change to this method. However, 2D points and 2D images are used as example images herein for ease of representation.

Next, in step 120, distances are computed between each pair of sub-patterns 110. These distances are stored in a look-up table for later use, in a data storage entity hereinafter referred to as the "distance table". In one embodiment, shown in FIG. 2A, the distance 205 between a pair of sub-patterns 110 is the minimum distance between any points within the regions represented by the two sub-patterns 110.

Figure 3A:
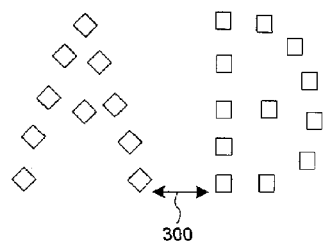
FIG. 3A shows a pair of sets of feature points that illustrates the distance between sub-patterns as the minimum distance between any two feature points of each sub-pattern.
Figure 3B:
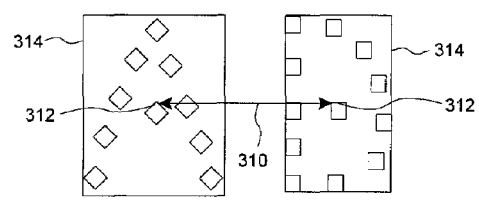
FIG. 3B shows a pair of sets of feature points each within a bounding box that illustrates the distance between sub-patterns as the distance between the centers of the bounding boxes of sub-patterns.
Figure 3C:
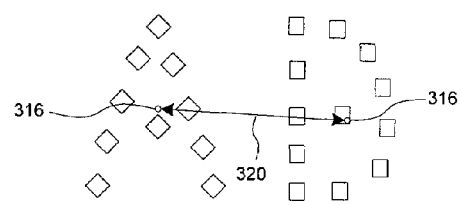
FIG. 3C shows a pair of sets of feature points each having a computed "center-of-mass" that illustrates the distance between sub-patterns as the distance between the centers-of-mass.

In an alternate embodiment shown in FIG. 3A, the minimum distance 300 computed is between any two features within the sub-patterns, if the sub-patterns are represented by features. In another embodiment shown in FIG. 3B, this distance is the distance 310 between the two centers 312 of the bounding boxes 314 of the two sub-patterns shown in FIG. 3B. In a preferred embodiment shown in FIG. 3C, the distance 320 is computed between the so-called "centers of mass" 316 of the two sub-patterns, where the center of mass is the average of the positions of all features in the sub-pattern.

Figure 4A:
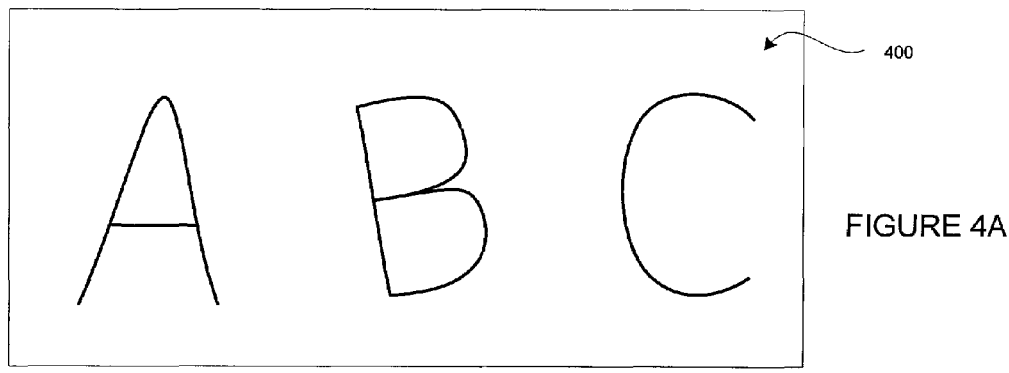
FIG. 4A is an example of a target image of a pattern having three sub-patterns.
Figure 4B:
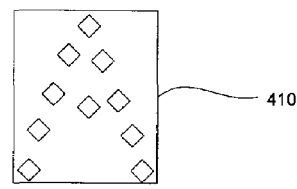
FIG. 4B is a set of features of a sub-pattern to be located within the target image of FIG. 4A.

In step 130 a sub-pattern is selected for initial search. Referring to FIG. 4B, this sub-pattern 410 must be located in a target image 400 of FIG. 4A without the benefit of any additional information as to where exactly it might be, because it is the first sub-pattern searched. Therefore, this initial sub-pattern 410, or "anchor" pattern, should be chosen so as to maximize "findability" in an image, relative to the other potential sub-patterns. To maximize findability, the method of the invention scores all sub-patterns according to a criterion or set of criteria, and chooses the highest-scoring sub-pattern as the anchor pattern. In one embodiment, the score is the area of the region covered by the sub-pattern. In another embodiment, the score is the number of feature points in the sub-pattern. In another embodiment, the score is based on proximity to other sub-patterns computed with the same distance metric discussed above in reference to 300, 310, and 320, where a sub-pattern that is near many other sub-patterns scores relatively high. In a preferred embodiment, the utility of each sub-pattern as a search pattern ("findability") is judged by using that sub-pattern to do a search on the initial pattern, if available. A sub-pattern scores higher if it provides only a single good match, and does not result in extra matches in other locations of the image, or at other orientations, scales, etc. With this embodiment, a circle, for example, would not be considered a good pattern, because it would yield multiple matches at different angles, since a circle looks the same when rotated in place. In another preferred embodiment, several or all of these scoring methods are combined to give a master score, either by simply adding scores together, or by weighting them and then adding them (where the weights would be chosen according to whatever works best empirically for the particular search method used), or by multiplying them together, or by any other reasonable method for combining multiple scores.

Per step 150 of FIG. 1, the anchor pattern 410 is sought in the target image 400 (also 140 in FIG. 1) using any known feature-based search method that finds a pattern despite changes in appearance, such as changes in position, x-dimension scale, y-dimension scale, aspect ratio, angle, or other degrees of freedom (D.O.F), even including generalized deformation. Such pattern search methods include feature-based search methods, including some "geometric" search methods. See, for example, "A Feature-Based Image Registration Algorithm Using Improved Chain-Code Representation Combined with Invariant Moments", IEEE Trans. on Geoscience and Remote Sensing, Vol. 37, No. 5, September 1999, and "Multiresolution Feature-Based Image Registration", Visual Comm. and Image Processing 2000, Proceedings of SPIE vol. 4067 (2000), pp. 1490–1498, Perth, Australia, 20–23 Jun. 2000. The anchor pattern 410 is searched for over a range of angles, scales, etc., the range being based on a predetermined or user-provided deformation rate estimate, which estimate indicates how much local deformation may occur to the pattern. A larger deformation rate estimate means that the anchor pattern may be dissimilar from versions that may be present in the target image, and therefore a larger range of angles, scales. etc. should be used to search for the anchor. For example, the user may indicate that the search should be done over an angle range of −10 to +20 degrees, in the case of a large deformation rate estimate. The actual search range would then be expanded by, for example, 70%, resulting in a search range of −17 to +34 degrees. For another example, a smaller deformation rate estimate might instead expand the range by only 20%, resulting in a search range of −12 to +24 degrees. Similar increases in range occur for each available degree of freedom, such as x-dimension scale, y-dimension scale, aspect ratio, etc.

If the chosen anchor pattern 410 is not found within the target image 400 at step 150, or if it is found but the remaining search steps 160,170, 172–178 are unsuccessful in matching the rest of the pattern, a different anchor pattern is selected using the same methods described above, except the next-highest scoring sub-pattern is chosen instead of the failed sub-pattern. If no anchor pattern is ever found within the target image 400, even after a plurality of attempts 165, the method is deemed to have failed to locate the main pattern in the image, and consequently it cannot characterize the deformation of the pattern 180. In this case, either the deformation was too extreme to allow the pattern 410 to be found with the method of the invention, or the user-supplied deformation-rate estimate was too low, or the pattern 410 was not in fact present in the image 400 at all.

Figure 4C:
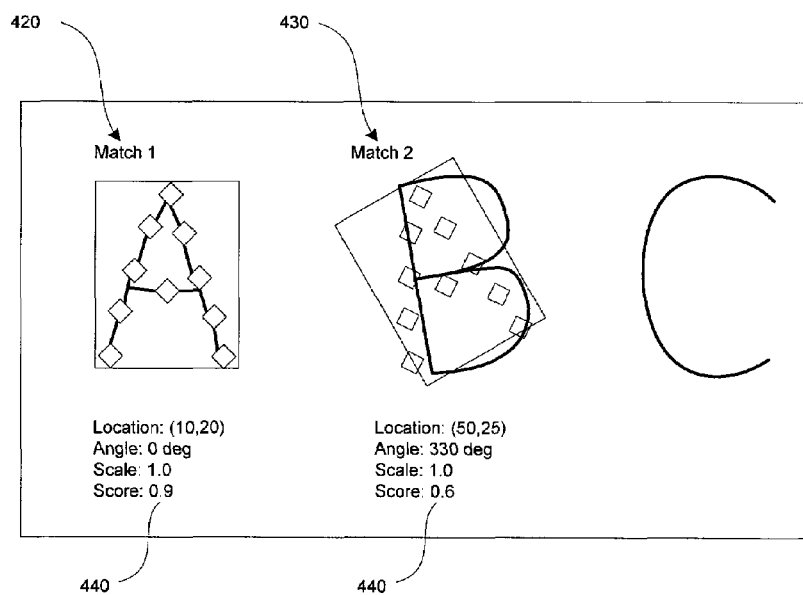
FIG. 4C is an illustration of two matches of the set of features of the sub-pattern to be located within the target image of FIG. 4A, with the match data for each of the two matches.

Referring to FIG. 4C, if more than one occurrence 420 430 of the anchor pattern 410 is found in the target image 400, the highest scoring match 440 (e.g., Match 1) is used first for the rest of the steps 160, 170, 172–178,180, according to the value of the scoring function which depends on whatever search method was used. If subsequent patterns cannot be successfully matched using the highest scoring match by the rest of the steps set forth below 160, 170, 172–178, 180, the steps 160, 170, 172–178, 180 are repeated for each anchor match, in order of decreasing score.

Referring to FIG. 1, at step 160, to select a next sub-pattern to search, the remaining sub-patterns not including the anchor pattern 410 are then scored. In one embodiment, the score is the area of the region covered by a sub-pattern. In another embodiment, the score is the number of feature points in a sub-pattern. A preferred embodiment uses the distance (as previously computed above) between the anchor pattern and the associated sub-pattern, with smaller distances scoring higher—that is, the sub-pattern nearest to the anchor pattern will be chosen. A refinement to this embodiment gives higher scores to sub-patterns that are near more than one previously found pattern, if such patterns exist. The reason for this is that having more than one previously located, or "anchored", pattern nearby increases the confidence in the expected location of the new sub-pattern, as there are a larger number of successfully matched features in the immediately surrounding area, reducing the potential for unexpected deformation. A key assumption here is that as the search area moves away from regions with found matches, the potential for deformation increases, as even small, consistent deformations (such as a line of text printed on a curved path) add up to large deformations across a large gap. In another preferred embodiment, several or all of these scoring methods are combined to give a master score, either by simply adding scores together, or by weighting them and then adding them (where the weights would be chosen according to whatever works best empirically for the particular search method used), or by multiplying them together, or by any other reasonable method for combining multiple scores.

At step 170, the highest-scoring sub-pattern is searched for in the target image 400, again using any search method known in the art that finds patterns in the presence of some sort of distortion, including but not limited to distortion of position, angle, x-dimension scale, y-dimension scale, etc.

Figure 1A:
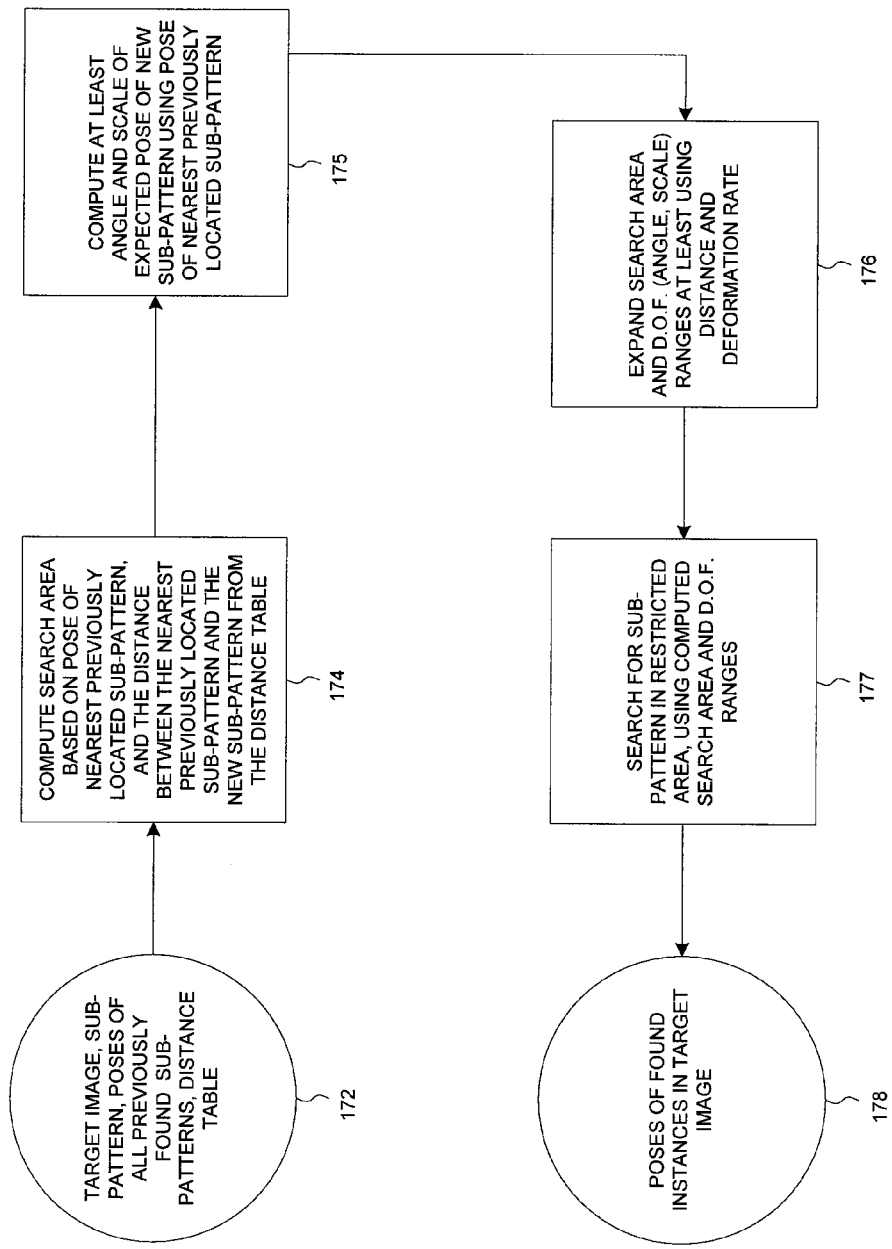
FIG. 1A is a flow chart of an embodiment of a step 170 of FIG. 1.
Figure 5A:
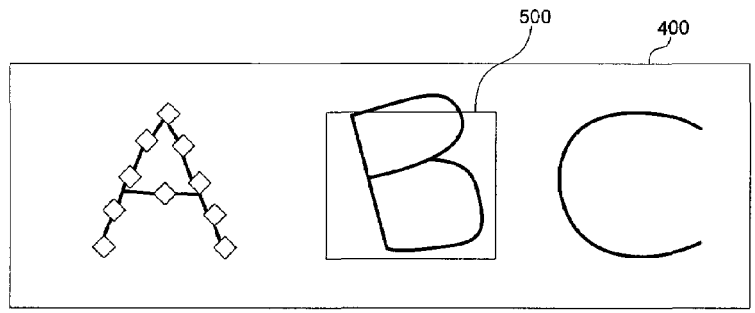
FIGS. 5A–5E show a target image of a pattern having three sub-patterns, one sub-pattern serving as a "local anchor"
Figure 5B:
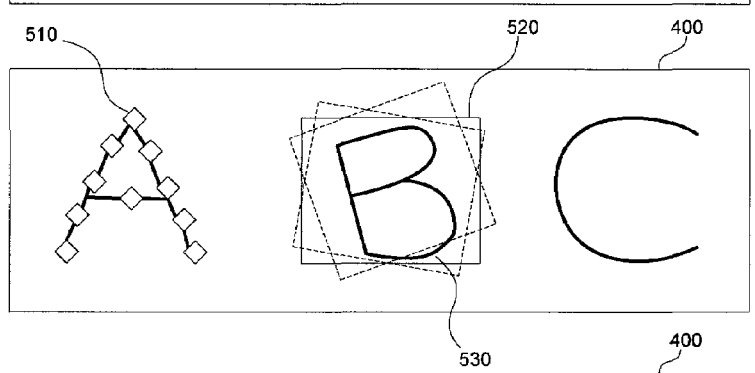
Figure 5C:
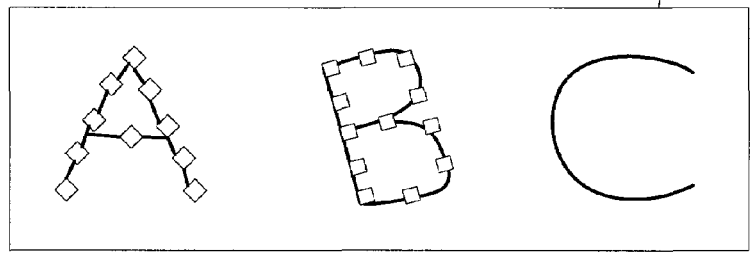

With reference to FIGS. 1A and 5A, the search range of this sub-pattern search 170 is restricted, which allows the search 170 to run in less time than a full search of the image 400, and which also reduces the possibility of spurious matches by tending to exclude them from the search range. Inputs 172 to the sub-pattern search 170 include the target image 400, sub-pattern to be located (for example, 410), locations of all previously found sub-patterns (for example, see FIG. 4C), and the distance table. The distance table is the list of distances between all pairs of sub-patterns that was computed in 120. The initial search ranges are based on the expected position 500 of the sub-pattern in the image, with a small amount of leeway added to the range to deal with incidental deformation 174. Since the pattern is assumed to be deformed in the target image, we must assume that sub-patterns will have small deformations as well. By increasing the ranges by a small amount, we increase the likelihood that the entire sub-pattern will be found within the search area, despite this extra deformation. Examples of this leeway include setting the size of the search window to be the size of the sub-pattern's nominal bounding box 500, plus three extra pixels on each side to account for the possibility of ink bleeding in a printed image, or similarly searching at plus or minus three degrees of angle from the nominal angle, though of course other values can be used that may further optimize a particular application of the method of the invention.

In step 176, the initial search ranges for those various degrees of freedom (e.g., search area, angle, scale) are then modified based on a number of factors. In one preferred embodiment, the initial search ranges are expanded further based on the user-provided "deformation rate estimate", where higher rates increase the ranges more. For example, an estimate of high deformation, arbitrarily chosen as 0.8 for this example, could result in an expansion of a nominal angular search range from 40 to 60 degrees to 20 to 80 degrees, while an estimate of low deformation, such as 0.2, could result in an expansion of the angular search range to only 35 to 65 degrees. In a further preferred embodiment, the deformation rate estimate is multiplied by the distance between the current sub-pattern and the nearest previously located sub-pattern (called the "local anchor") 510 560. This results in larger search area ranges 570 for sub-patterns 580 that are further away from any known, "locally-anchored" regions 560 in the target image 400, and smaller search area ranges 520 for sub-patterns 530 that are closer to a known local anchor 510. In the embodiment, described above, where sub-patterns are chosen for searching based on the distances to more than one previously located sub-pattern, those distances can be combined here. If the nearby sub-patterns do not agree on the likely pose of the new sub-pattern, that is evidence that deformation to the pattern has occurred (as otherwise all sub-patterns would be found right where they're predicted to be anyway), so therefore the deformation estimate should be increased, to encompass the expected ranges from all nearby sub-patterns. In the embodiment of step 175, the position, as well as the angle, x-dimension scale, y-dimension scale, and other degrees of freedom of the local anchor 560 are used to determine the nominal, or expected, pose of the sub-pattern 550—the sub-pattern search is based on the assumption that the most likely place for the new sub-pattern is where it would be found if it had exactly the same sort of distortion (angle, scale, etc.) as its local anchor 560.

Figure 5D:
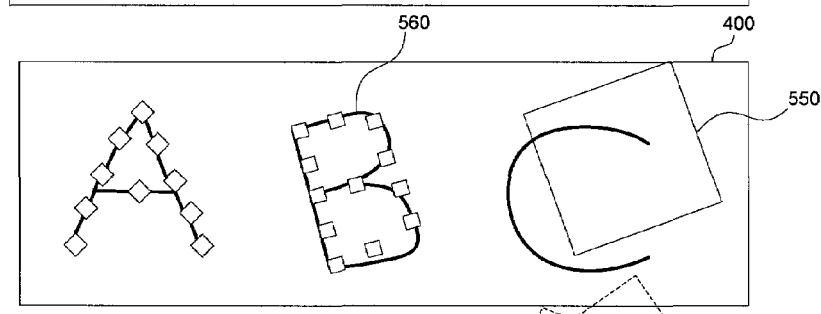
Figure 5E:
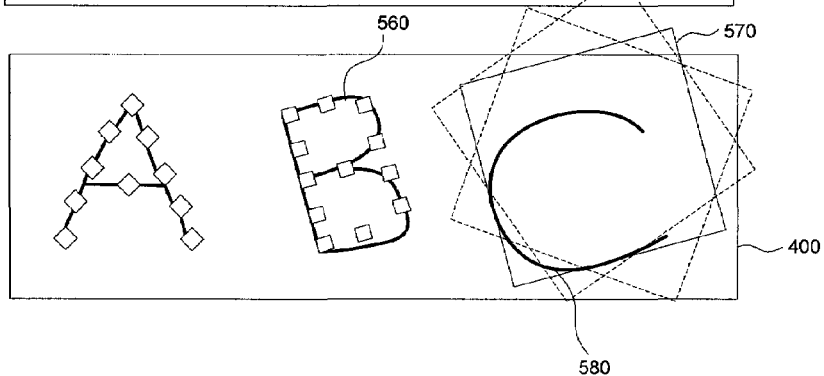

Another embodiment varies the D.O.F. search ranges based on the score obtained by the search for the local anchor, as the score is considered to be a measure of certainty, and when the local anchor's pose is uncertain, the search ranges for nearby sub-patterns can be advantageously enlarged 570, as shown in FIGS. 5D and 5E. A further preferred embodiment uses all of these factors to modify the D.O.F. search ranges. Another preferred embodiment further uses more than one local anchor, if more than one exists, and combines the search ranges determined using each local anchor to determine an overall set of D.O.F. search ranges. This last embodiment is particularly useful when the deformation is not smooth, and several nearby sub-patterns might have different types of distortion. In that case, the new sub-pattern might be distorted similarly to any of the known sub-patterns, so including all of those potential distortions in the search range is important, though there is of course a speed cost in the search over the widened ranges. An important benefit of the method of the invention is to maximize the likelihood that the D.O.F. search range includes the instance of the sub-pattern in the target image 530 580, even though that instance may not be where it's expected to be, while also minimizing the computational overhead of the search by limiting D.O.F. search range to some D.O.F. range that is less than the maximum possible range in each D.O.F., such as less than the whole image area in the spatial D.O.F., less than 360 degrees in the angular D.O.F., etc.

Figure 6A:
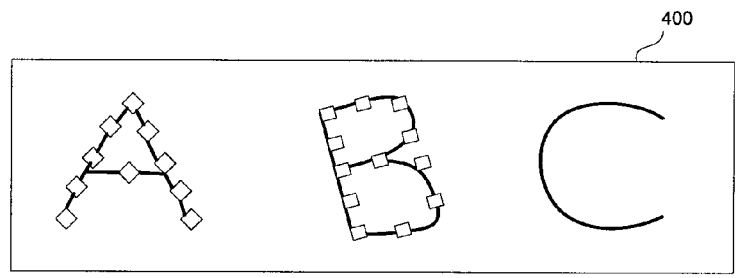
FIGS. 6A–6D show a target image of a pattern having three sub-patterns, illustrating multiple matches for one of the three sub-patterns and their associated scores.
Figure 6B:
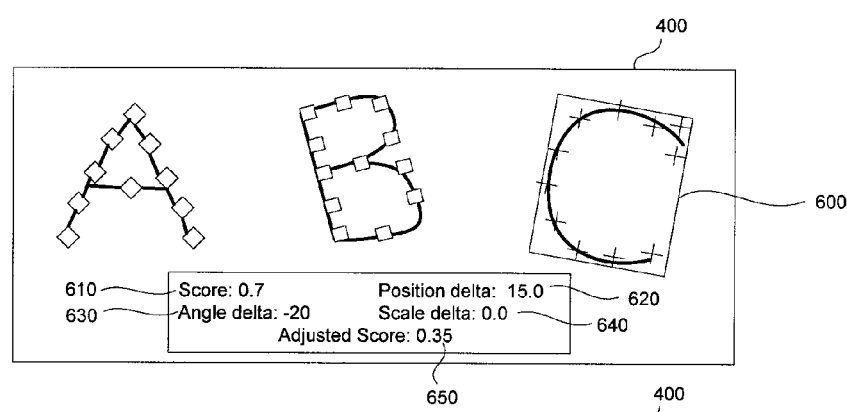
Figure 6C:
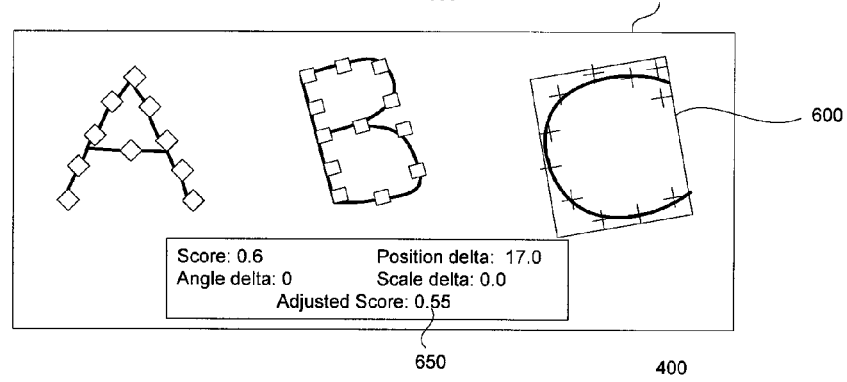
Figure 6D:
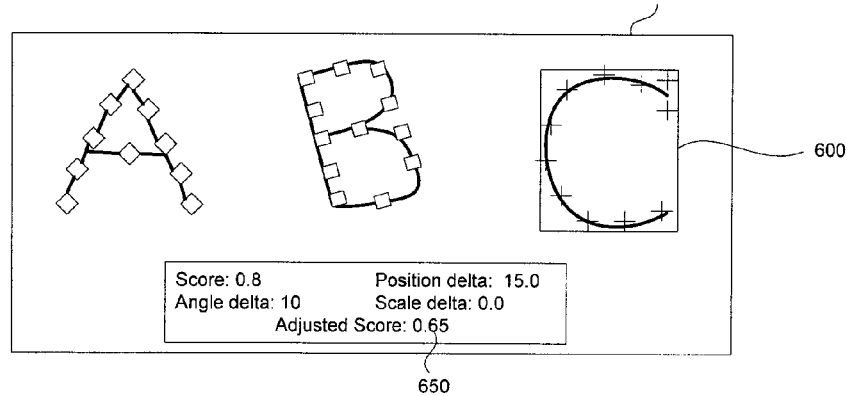
Figure 7A:
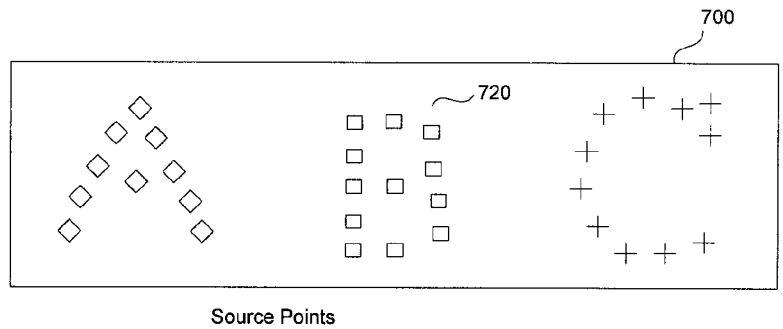
FIG. 7A shows three sets of source feature points corresponding to a pattern having three sub-patterns.
Figure 7B:
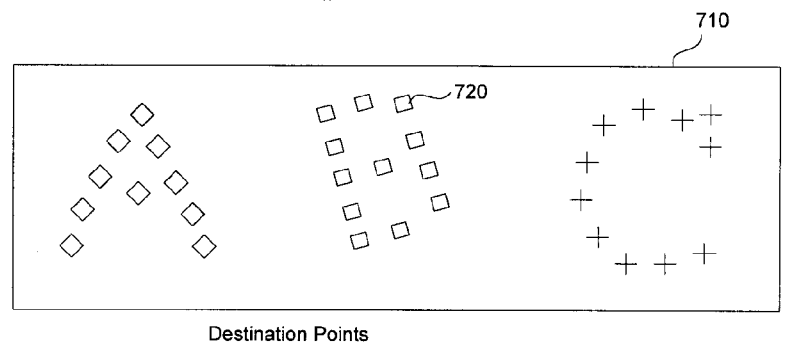
FIG. 7B shows three sets of destination feature points corresponding to a pattern having three sub-patterns.
Figure 7C:
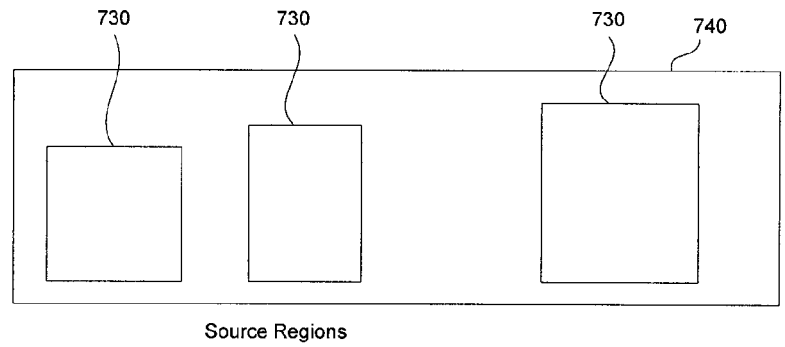
FIG. 7C shows three source regions corresponding to a pattern having three sub-patterns.
Figure 7D:
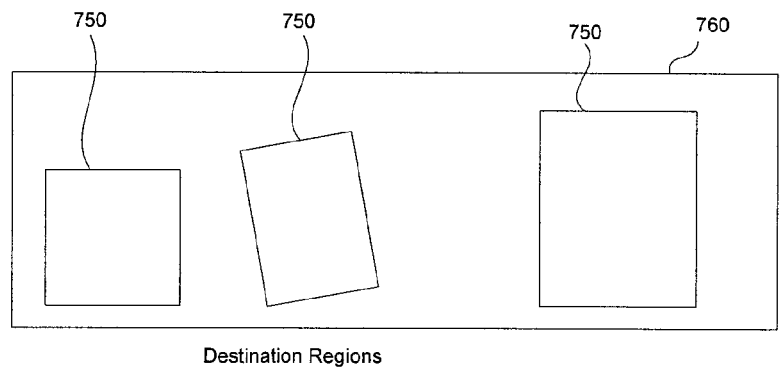
FIG. 7D shows three destination regions corresponding to a pattern having three sub-patterns.

Referring to FIG. 1A in step 177, a search is performed for any matches of the sub-pattern 600 using the limited D.O.F. search ranges. If there is more than one match of this new sub-pattern 600, shown in FIGS. 6B–6D, score the matches and choose the highest scoring one. In one embodiment of this scoring function, the score is simply the score 610 indicating a measure of match quality returned by the underlying search algorithm. In another embodiment, the score is determined based on the match's similarity to the expected match location given the local anchor. That is, if the match is at the position 620, angle 630, scale 640, etc. that would be expected if the only distortion was that given by the local anchor's pose, it scores higher. The further away a degree-of-freedom gets from any of these expected (or nominal) values, for example by being translated, rotated, or scaled differently than the anchor, the lower the score gets.

An actual score can most easily be computed by looking at how far away each D.O.F. value is from the expected value, relative to the possible range, and expressing that as a ratio. For example, if the expected angle was 20 degrees, and the search range was 10 to 30 degrees, then if the match angle was at 16 degrees, then the score would be 1.0−(20−16)/(20−10)=1.0−0.4=0.6. If the match angle was at 12 degrees, the score would be 1.0−(20−12)/(20−10)=1.0−0.8=0.2. Subtracting the ratio from 1.0 causes high scores to indicate better matches than low scores, which is what is preferred. A preferred embodiment combines both of these scoring methods into a single score 650, either by multiplying them together, or by adding them, or by any reasonable scheme for combining multiple score values into a single score.

Referring to FIGS. 1 and 1A, whether or not any matches were actually found at step 178 of step 170, the method then repeats 165 the sub-pattern search described above, not searching for previously found sub-patterns, until searches have been performed for all sub-patterns in the original set of sub-patterns 110160. On each subsequent iteration 165, the step that selects the next sub-pattern for search 160, as described above, does not select the best-scoring sub-pattern considering only a single anchor pattern, but rather it selects it considering all of the previously found sub-patterns. That is, the candidate sub-patterns are scored against all "anchored" sub-patterns, and the best score determines which will be the next sub-pattern selected 160.

After the various parts of the target pattern 400 have been individually located in the image, an aggregate score for the match is computed based on the sub-pattern quality scores (already computed as described above 650), where non-located sub-patterns score as zero. In one embodiment, the scores of the sub-patterns are simply averaged. In a preferred embodiment, these sub-scores are combined as a weighted average, being weighted according to the area enclosed by the features of each sub-pattern, or by the size of the bounding-box. In another preferred embodiment, they are weighted by the number of features in each sub-pattern.

This aggregate score is returned, or a failure message is returned if the pattern could not be matched. The individual poses of the sub-pattern matches can also be returned, and also the individual sub-scores corresponding to the individual poses.

In a preferred embodiment, the individual poses of the sub-pattern, and the exact found positions of individual features in each sub-pattern are used to define a deformation map 180, and that deformation map can be returned as output, either instead of or in addition to other match information. In a refinement to that embodiment, the feature information used to help define the deformation map is a sub-set of the feature points provided by prior steps of the method for finding a deformed pattern. For example, the set of feature points can be sub-sampled, resulting in a less accurate result (as fewer features are considered), but then the deformation map can often be computed much faster from fewer features In another refinement, these points are a representative sampling of the region that each sub-pattern occupies, such as the corners or edges of the bounding box of the region, or a set of points along whatever contour may define the region. In a preferred refinement to this embodiment, individual feature points that were not matched as part of the core search for a deformed pattern are omitted from the list of feature points used to create the deformation map 180. The location or pose of the pattern in the image is returned 182 by the method of the invention, though the exact concept of "location" or "pose" for a deformed pattern permits a variety of definitions, the particular definition being chosen in accordance with the requirements of a particular application, or the convenience of a user or developer. In one embodiment, the location of the pattern is deemed to be the location of a particular designated "location point" in the pattern, the location point being designated by a user. In this embodiment, the returned location is the "location point" mapped through the above-described deformation map, which is a close approximation to the location of that point in the deformed pattern. In another embodiment, the pose of the pattern is deemed to be the location of a user-specified sub-pattern. In this case, the location includes the full pose of the sub-pattern (which was determined by the method of the invention), not just the position information. In another embodiment, the pose is computed by fitting an affine transform to all found feature points using any standard method for fitting such a transform, such as a least-squares fit, or other fitting methods disclosed herein. This yields only a rough approximation of the location of the pattern, as all deformation has been stripped away. However, for patterns that have only minor deformation, this may be the simplest solution. In a preferred embodiment, the deformation map itself is returned, as this map contains the most detailed information available on the pattern's position in the image. In this embodiment, the user can define "location" any way they choose by using the information provided by the deformation map. For example, they could map the four corners of the pattern rectangle through the deformation map to yield a "location quadrilateral" for the deformed pattern.

Method for Characterizing Deformation of a Pattern

Figure 9:
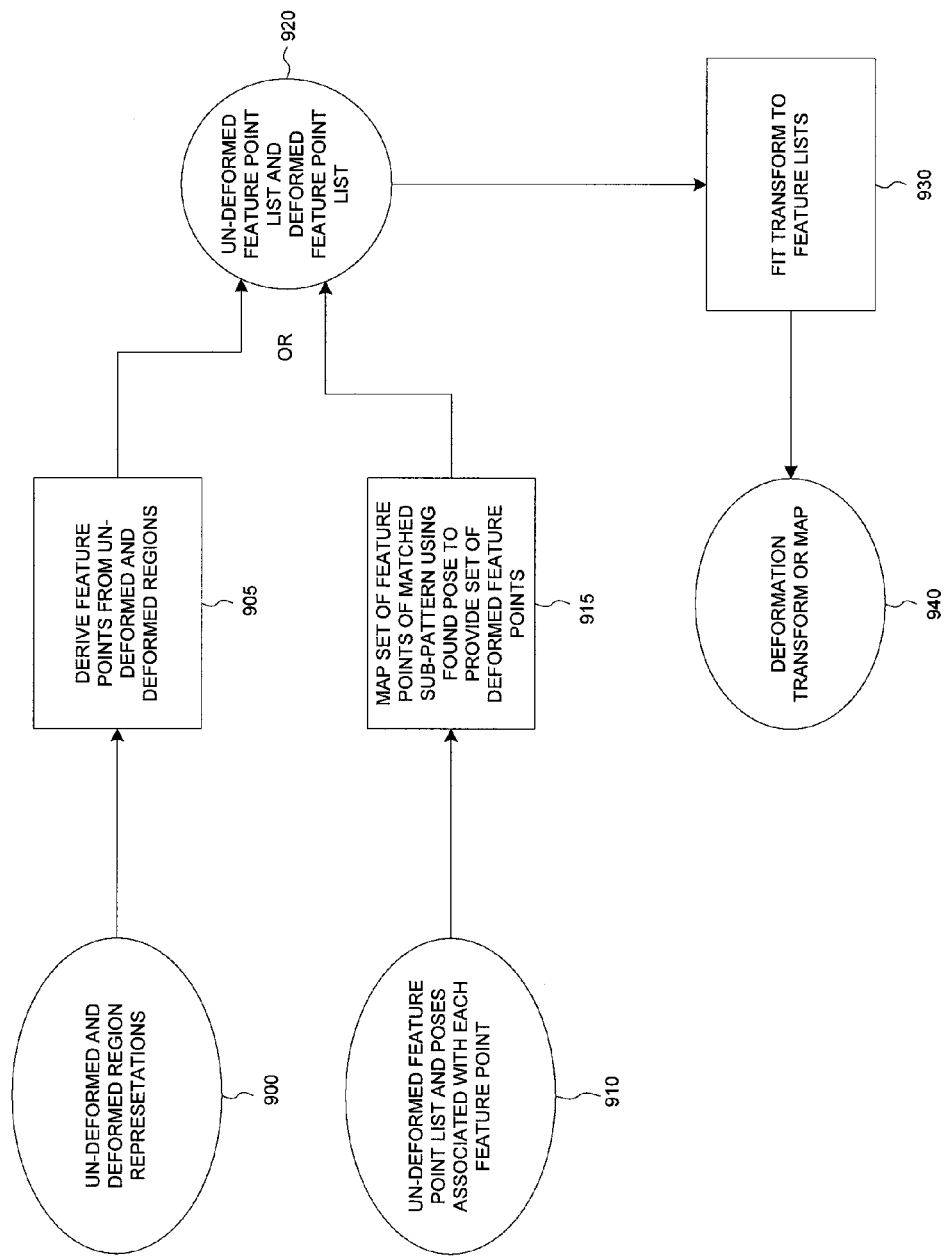
FIG. 9 is a flow chart of an embodiment of a method for characterizing deformation of a pattern.
Figure 10A:
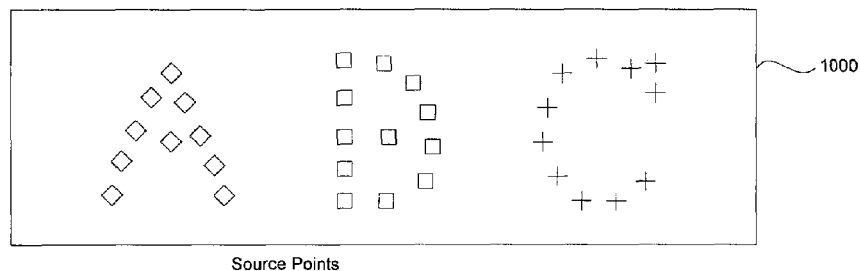
FIG. 10A shows three sets of source feature points corresponding to an undeformed pattern having three sub-patterns.
Figure 10B:
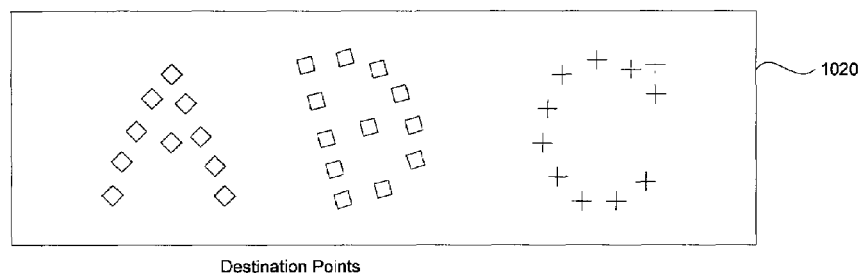
FIG. 10B shows three sets of destination feature points corresponding to a deformed version of the pattern of FIG. 10A.
Figure 10C:
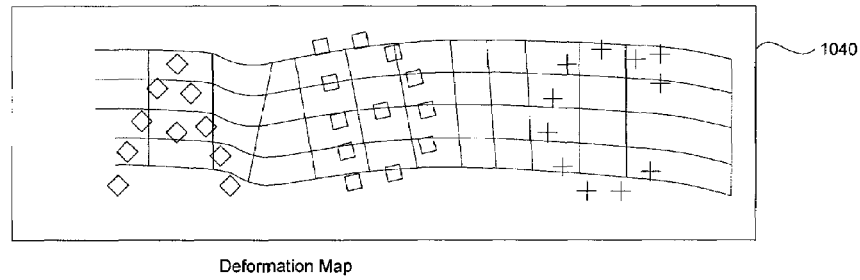
FIG. 10C is a deformation map of the deformation of the deformed pattern of FIG. 10B.

Referring to FIGS. 7, 9, and 10, to define a deformation map 1040 as shown in FIG. 10C, a set of feature points representing an un-deformed pattern 700, 1000, and a corresponding set of feature points representing the deformed pattern 710, 1020 are used 920. Each feature point 720 represents a point of information in the pattern or image 700, 710, such as a point along a brightness boundary within the image 700, 710. These corresponding sets of feature points 700, 710 can be determined by any method known in the art, including but not limited to the search method of the invention described herein above.

The above-described search method of the invention employs sub-patterns that each include a plurality of feature points which can be input directly as "undeformed pattern" points 700. The above-described search method of the invention also provides a found pose for each matched sub-pattern 910. Mapping each matched sub-pattern's set of feature points through the found pose gives a set of "deformed pattern" feature points 915 to be used as input to the method disclosed herein for characterizing the deformation of a pattern.

Alternatively, a set of source regions 730 can be used as initial inputs 900. The set of source regions 730 together represent an un-deformed pattern 740, and a corresponding set of regions 750 represent a deformed pattern 760. An example of a set of source regions is a grid of rectangles that cover the full area of an un-deformed pattern, and a corresponding set of destination regions is a collection of contiguous affine rectangles (e.g., rectangles that have undergone rotation, skew, scaling, and/or translation) that represent the approximate deformations of the rectangles of the grid.

Figure 8A:
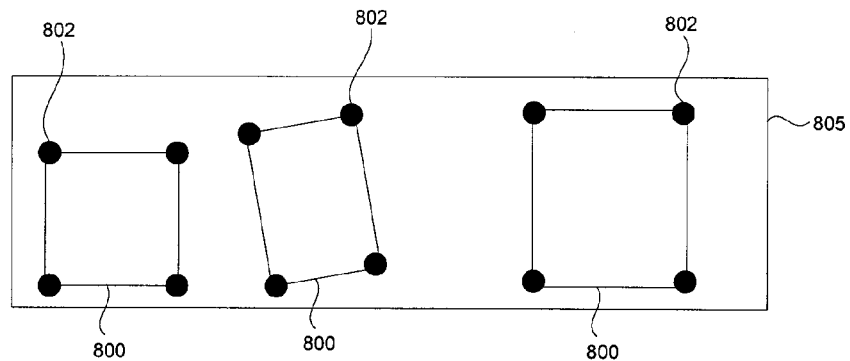
FIG. 8A shows three sets of feature points corresponding to a pattern having three sub-patterns, the feature points being corners of bounding shapes of the three sub-patterns.
Figure 8B:
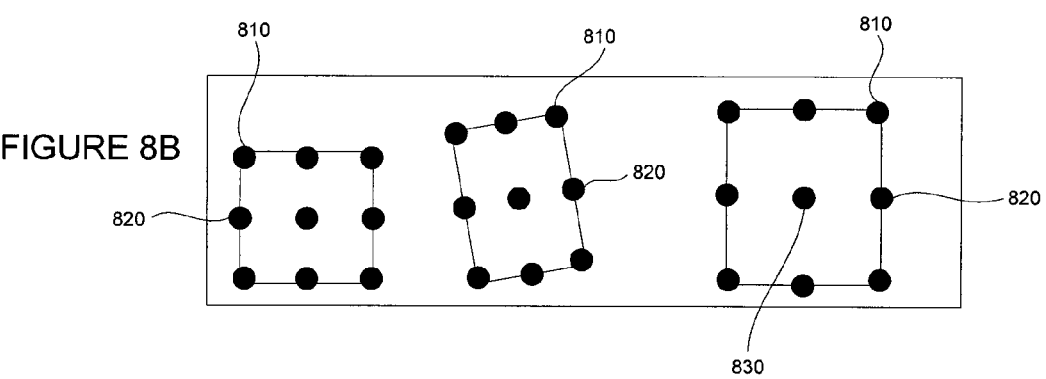
FIG. 8B shows three sets of feature points corresponding to a pattern having three sub-patterns, the feature points being corners of bounding shapes, centers of bounding shapes, and mid-points of the vertices of the bounding shapes.
Figure 8C:
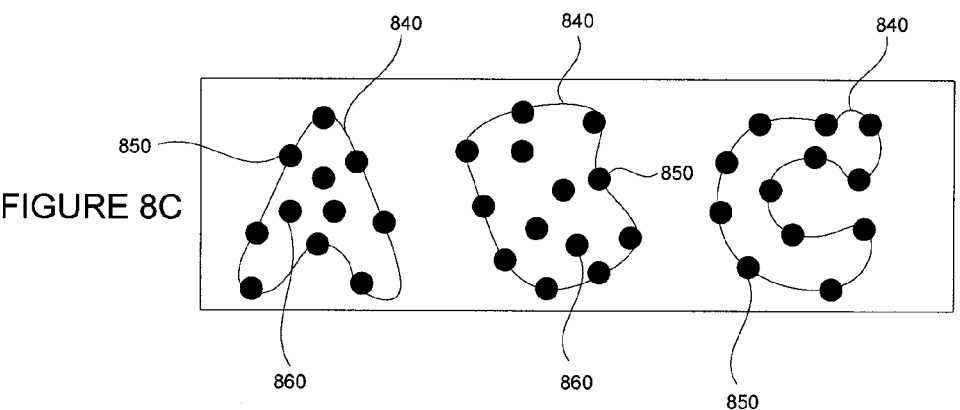
FIG. 8C shows three sets of feature points corresponding to a pattern having three sub-patterns, the feature points being a sampling of points along a bounding contour, and along an interior contour.

Referring again to FIGS. 8 and 9, to use the regions 900, a list of feature points 920 is created from the source regions and destination regions by any reasonable method 905. For example, in one embodiment illustrated in FIG. 8A, where the regions are rectangles or other regular shapes 800 in the image 805, the feature points are the corners (vertices) 802 of the shapes 800. In another embodiment shown in FIG. 8B, where the regions are again rectangles or other regular shapes, the feature points are a representative sampling of points within and along the shapes, such as the corners (vertices) 810, the centers (midpoints) of the sides 820, and the center of the shape 830 (or any defined interior point). In another embodiment, set forth in FIG. 8C, where the regions are more general contours 840, a sampling of points along the contour 850, or within the shape itself 860, are used.

A global deformation map 1040 as shown in FIG. 10C is then created by fitting a transform 930 to the set of source 1000 and destination 1020 points 920, using any standard method of fitting known to those skilled in the art, such as a least-squares fit, a least median of squares fit, a minimum $L_p$ norm estimation, a robust m-estimators fit, or a total variation fit. Also, some transforms, such as the "thin-plate spline" discussed below, can map the points exactly without relying on the approximate solution provided by a "fitting" method. In one embodiment, this deformation map 1040 is an affine map. If the deformation of the pattern is known to be solely or primarily perspective distortion, then a preferred embodiment is to fit a perspective transform to the points. If the deformation of the pattern is known to follow the curve of a cylinder, for example if the pattern were printed on a metal can, a generic cylinder or conic transform is used.

A preferred embodiment for accurately modeling more detailed deformation is the thin-plate-spline, a mathematical construct described in "Principal Warps: Thin-Plate Splines and the Decomposition of Deformations" by Fred L. Bookstein (IEEE Transactions on Pattern Analysis and Machine Intelligence, June 1989). Depending on the domain, any number of possible models can be fit to these points, including other types of splines, or any other transformation.

This global deformation map (transform) 940, 1040 is an approximation of the deformation of the pattern, with accuracy limited by whatever level of detail the provided feature points or regions possess, and limited by the appropriateness of the chosen transformation (e.g., perspective, cylinder, or spline) for modeling that deformation.

The global deformation map of the invention can be used to un-do or otherwise reverse the deformation of the deformed pattern so as to provide an un-deformed pattern.

Other variants and embodiments will occur to those skilled in the art, without departing from the spirit and scope of the invention. Accordingly, the invention is not intended to be limited by the detailed description, except as set forth in the following claims.

The invention claimed is:

1. A method for finding a deformed pattern in an image, the method comprising:

providing a plurality of features that represent the deformed pattern in the image;

dividing the plurality of features into a plurality of sub-pluralities, each sub-plurality representing a sub-pattern in the image, a plurality of the sub-patterns representing the deformed pattern;

determining a distance between each pair of sub-patterns of the plurality of sub-pluralities;

selecting a first sub-pattern to locate in the image;

locating the first sub-pattern in the image so as to provide a first sub-pattern location;

using the first sub-pattern location to select a second sub-pattern to locate in the image; and locating the second sub-pattern in the image so as to provide a second sub-pattern location; and using the first sub-pattern location and the second sub-pattern location to determine a location of the deformed pattern.

2. The method of claim 1, wherein providing a plurality of features that represent the deformed pattern in the image includes:

detecting features in the image.

3. The method of claim 2, wherein detecting features in the image includes:

detecting features in the image using a Sobel edge detector.

4. The method of claim 1, wherein determining a distance between each pair of sub-patterns of the plurality of sub-patterns includes:

storing each distance for later use.

5. The method of claim 1, wherein determining a distance between each pair of sub-patterns of the plurality of sub-patterns includes:

determining the minimum distance between the pair of sub-patterns.

6. The method of claim 1, wherein determining a distance between each pair of sub-patterns of the plurality of sub-patterns includes:

determining the distance between a first feature of a first sub-pattern and a second feature of a second sub-pattern.

7. The method of claim 1, wherein determining a distance between each pair of sub-patterns of the plurality of sub-patterns includes:

determining the distance between a first center of a first sub-pattern and a second center of a second sub-pattern.

8. The method of claim 1, wherein locating the first sub-pattern in the image so as to provide a first sub-pattern location includes:

using a feature-based search method for locating the first sub-pattern in the image.

9. The method of claim 1, wherein locating the second sub-pattern in the image so as to provide a second sub-pattern location includes:

computing a search area using the location of the first sub-pattern.

10. The method of claim 1, wherein locating the second sub-pattern in the image so as to provide a second sub-pattern location includes:

computing an expected angle and an expected scale of the second sub-pattern.

11. The method of claim 10, wherein the expected scale is the expected X-dimension scale and the expected Y-dimension scale.

12. The method of claim 10, further including computing an expected aspect ratio of the second sub-pattern.

13. The method of claim 10, further including:
using the expected angle and the expected scale of the second sub-pattern so as to provide an angular search range and a scale search range.

14. The method of claim 13, wherein the scale search range is an X-dimension scale search range, and a Y-dimension scale search range.

15. The method of claim 13, further including:
using a distance between the first sub-pattern and the second sub-pattern; and
a deformation rate.

16. The method of claim 1, wherein locating the second sub-pattern in the image so as to provide a second sub-pattern location includes:
computing a search area using the location of the first sub-pattern;
computing an expected angle of the second sub-pattern and an expected scale of the second sub-pattern using the angle and scale of the first sub-pattern;
using the expected angle of the second sub-pattern, the expected scale of the second sub-pattern, a distance between the first sub-pattern and the second sub-pattern, and a deformation rate so as to provide an expanded search area, an angular search range, and a scale search range; and
locating the second sub-pattern within the expanded search area, the angular search range, and the scale search range so as to provide a second sub-pattern location.

17. The method of claim 16, wherein using the expected angle of the second sub-pattern, the expected scale of the second sub-pattern, a distance between the first sub-pattern and the second sub-pattern, and a deformation rate so as to provide an expanded search area, an angular search range, and a scale search range includes:
increasing the size of the expanded search area, the angular search range, and the scale search range upon an increase in the distance between the first sub-pattern and the second sub-pattern.

18. The method of claim 16, wherein using the expected angle of the second sub-pattern, the expected scale of the second sub-pattern, a distance between the first sub-pattern and the second sub-pattern, and a deformation rate so as to provide an expanded search area, an angular search range, and a scale search range includes:
increasing, in proportion to the deformation rate, the size of the expanded search area, the angular search range, and the scale search range.

19. The method of claim 16, wherein using the expected angle of the second sub-pattern, the expected scale of the second sub-pattern, a distance between the first sub-pattern and the second sub-pattern, and a deformation rate so as to provide an expanded search area, an angular search range, and a scale search range includes:
increasing, in proportion to the deformation rate, the size of the expanded search area, the angular search range, and the scale search range upon an increase in the distance between the first sub-pattern and the second sub-pattern.

20. The method of claim 16, wherein computing an expected angle of the second sub-pattern and an expected scale of the second sub-pattern using the angle and scale of the first sub-pattern includes:
computing an expected X-dimension scale and an expected Y-dimension scale using the X-dimension scale of the first sub-pattern and the Y-dimension scale of the first sub-pattern, respectively.

21. The method of claim 16, wherein computing an expected angle of the second sub-pattern and an expected scale of the second sub-pattern using the angle and scale of the first sub-pattern includes:
computing an angular uncertainty and a scale uncertainty of the second sub-pattern using an angular uncertainty and a scale uncertainty of the first sub-pattern, respectively.

22. The method of claim 21, wherein computing an angular uncertainty and a scale uncertainty of the second sub-pattern using an angular uncertainty and a scale uncertainty of the first sub-pattern, respectively includes:
computing an X-dimension scale uncertainty and a Y-dimension scale uncertainty of the second sub-pattern using an X-dimension scale uncertainty of the first sub-pattern, and a Y-dimension scale uncertainty of the first sub-pattern, respectively.

* * * * *

(12) INTER PARTES REEXAMINATION CERTIFICATE (0334th)
United States Patent
Davis

(10) Number: US 7,190,834 C1
(45) Certificate Issued: Dec. 20, 2011

(54) METHODS FOR FINDING AND CHARACTERIZING A DEFORMED PATTERN IN AN IMAGE

(75) Inventor: Jason Davis, Bellingham, MA (US)

(73) Assignee: Cognex Technology and Investment Corporation, Mountain View, CA (US)

Reexamination Request:
No. 95/001,180, Jun. 8, 2009

Reexamination Certificate for:
Patent No.: 7,190,834
Issued: Mar. 13, 2007
Appl. No.: 10/625,205
Filed: Jul. 22, 2003

(51) Int. Cl.
*G06K 9/00* (2006.01)
*G06K 9/46* (2006.01)

(52) U.S. Cl. .......................... 382/181; 382/191
(58) Field of Classification Search ............ 382/181
See application file for complete search history.

(56) References Cited

To view the complete listing of prior art documents cited during the proceeding for Reexamination Control Number 95/001,180, please refer to the USPTO's public Patent Application Information Retrieval (PAIR) system under the Display References tab.

*Primary Examiner* — Colin LaRose

(57) ABSTRACT

A method is disclosed for finding a deformed pattern in an image using a plurality of sub-patterns. By advantageously restricting sub-pattern search ranges, search speed is improved, and the incidence of spurious matches is reduced. The method also quickly decides which sub-pattern result, of several potential candidates, is most likely to be the correct match for a deformed sub-pattern. Also, a method is provided for characterizing a deformed pattern in an image by using results from feature-based search tools to create a mapping that models the deformation of the pattern. A transform, selectable by a user, is fit to the results from the search tools to create a global deformation mapping. This transformation is fit only to feature points derived from matches resulting from successful sub-pattern search, without including data from areas of the pattern that were blank, not matched, or otherwise didn't contain information about the pattern's distorted location.

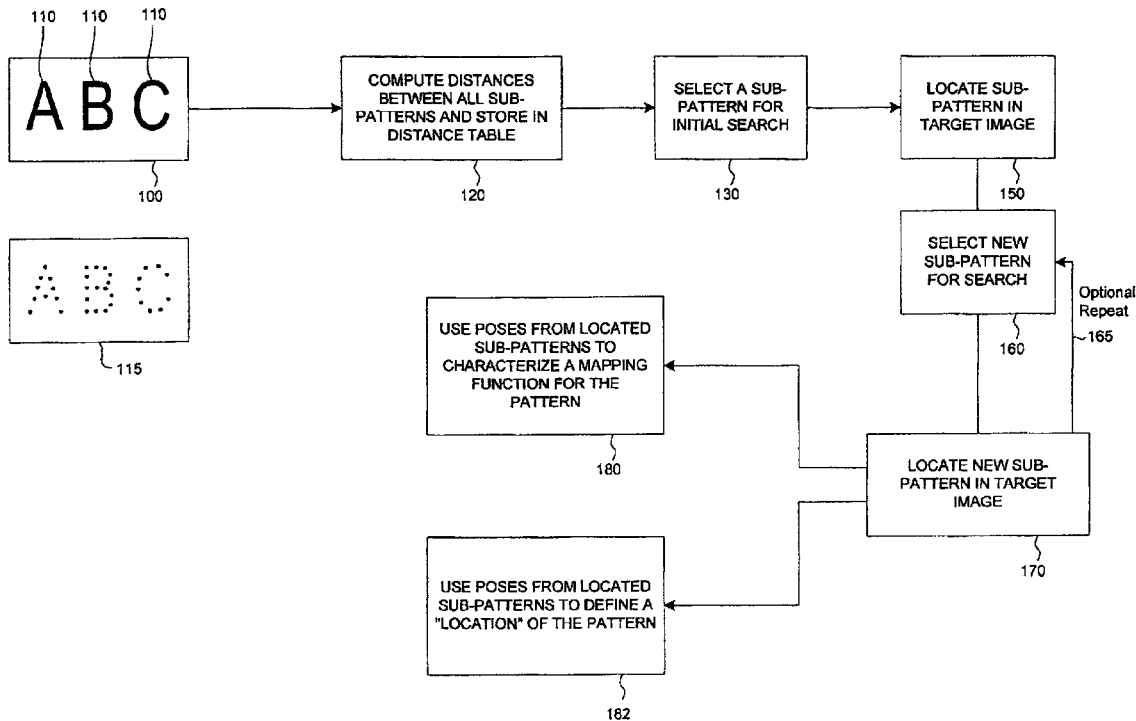

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-9 are cancelled.
Claims 10-22 were not reexamined.

\* \* \* \* \*